(12) United States Patent
Shukla et al.

(10) Patent No.: US 11,146,762 B2
(45) Date of Patent: Oct. 12, 2021

(54) METHODS AND SYSTEMS FOR RECONSTRUCTING A HIGH FRAME RATE HIGH RESOLUTION VIDEO

(71) Applicant: Samsung Electronics Co., Ltd., Suwon-si (KR)

(72) Inventors: Alok Shankarlal Shukla, Karnataka (IN); Sathish Chalasani, Karnataka (IN); Narasimha Gopalakrishna Pai, Karnataka (IN); Pyo-jae Kim, Suwon-si (KR); Jin-hee Na, Seoul (KR); Abhishek Somani, Karnataka (IN); Venkatesh Ambati, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 16/070,923

(22) PCT Filed: Jan. 19, 2017

(86) PCT No.: PCT/KR2017/000648
§ 371 (c)(1),
(2) Date: Jul. 18, 2018

(87) PCT Pub. No.: WO2017/126899
PCT Pub. Date: Jul. 27, 2017

(65) Prior Publication Data
US 2021/0235045 A1 Jul. 29, 2021

(30) Foreign Application Priority Data

Jan. 19, 2016 (IN) .............................. 201641002005
Dec. 27, 2016 (IN) .............................. 201641002005

(51) Int. Cl.
*H04N 9/04* (2006.01)
*H04N 9/64* (2006.01)

(52) U.S. Cl.
CPC ..... *H04N 9/04557* (2018.08); *H04N 9/04511* (2018.08); *H04N 9/04515* (2018.08); *H04N 9/64* (2013.01); *H04N 2209/046* (2013.01)

(58) Field of Classification Search
CPC .......... H04N 9/04557; H04N 9/04515; H04N 9/04511; H04N 9/64; H04N 2209/046
See application file for complete search history.

(56) References Cited

U.S. PATENT DOCUMENTS 8,013,910 B2   9/2011 Kato et al.
8,233,084 B1 * 7/2012 Chou ................... H04N 7/0115
                                                    348/441

(Continued)

FOREIGN PATENT DOCUMENTS

JP   2004-186839 A   7/2004
WO   2015/120443 A1  8/2015

*Primary Examiner* — Mekonnen D Dagnew
(74) *Attorney, Agent, or Firm* — Jefferson IP Law, LLP

(57) ABSTRACT

Methods and systems for reconstructing a high frame rate high resolution video in a Bayer domain, when an imaging device is set in a Flexible Sub-Sampled Readout (FSR) mode are described. A method provides the FSR mode, which utilizes a multiparty FSR mechanism to spatially and temporally sample the full frame Bayer data. The multi parity FSR utilizes a zigzag sampling that assists reconstruction of motion compensated artifact free high frame rate high resolution video with full frame size. The method includes reconstructing the high frame rate high resolution video using the plurality of parity fields generated. The reconstruction is based on a FSR reconstruction mechanism that can be a pre-Image Signal Processor (ISP) FSR reconstruction or a post-ISP FSP reconstruction based on bandwidth capacity of an ISP used by the imaging device.

13 Claims, 13 Drawing Sheets

(56) References Cited

U.S. PATENT DOCUMENTS

| | | |
|---|---|---|
| 8,830,367 B1 | 9/2014 | Mobbs et al. |
| 8,970,721 B2 | 3/2015 | Hiramoto et al. |
| 2005/0036063 A1* | 2/2005 | Chen ............... H04N 7/012 |
| | | 348/452 |
| 2007/0263937 A1 | 11/2007 | Rizko |
| 2013/0208154 A1 | 8/2013 | Wang et al. |
| 2015/0016748 A1 | 1/2015 | Ko et al. |
| 2015/0042853 A1 | 2/2015 | Minagawa et al. |
| 2017/0318273 A1* | 11/2017 | Mantzel ............... H04N 5/2257 |

* cited by examiner

[Fig. 1]
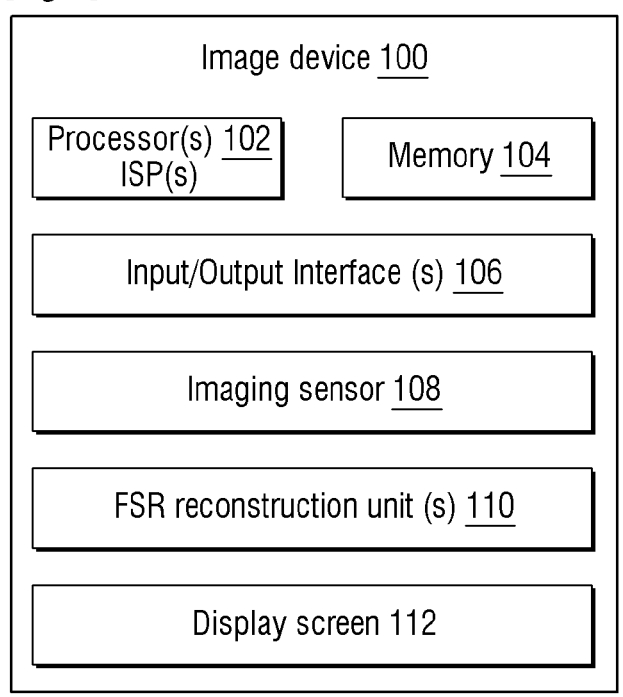

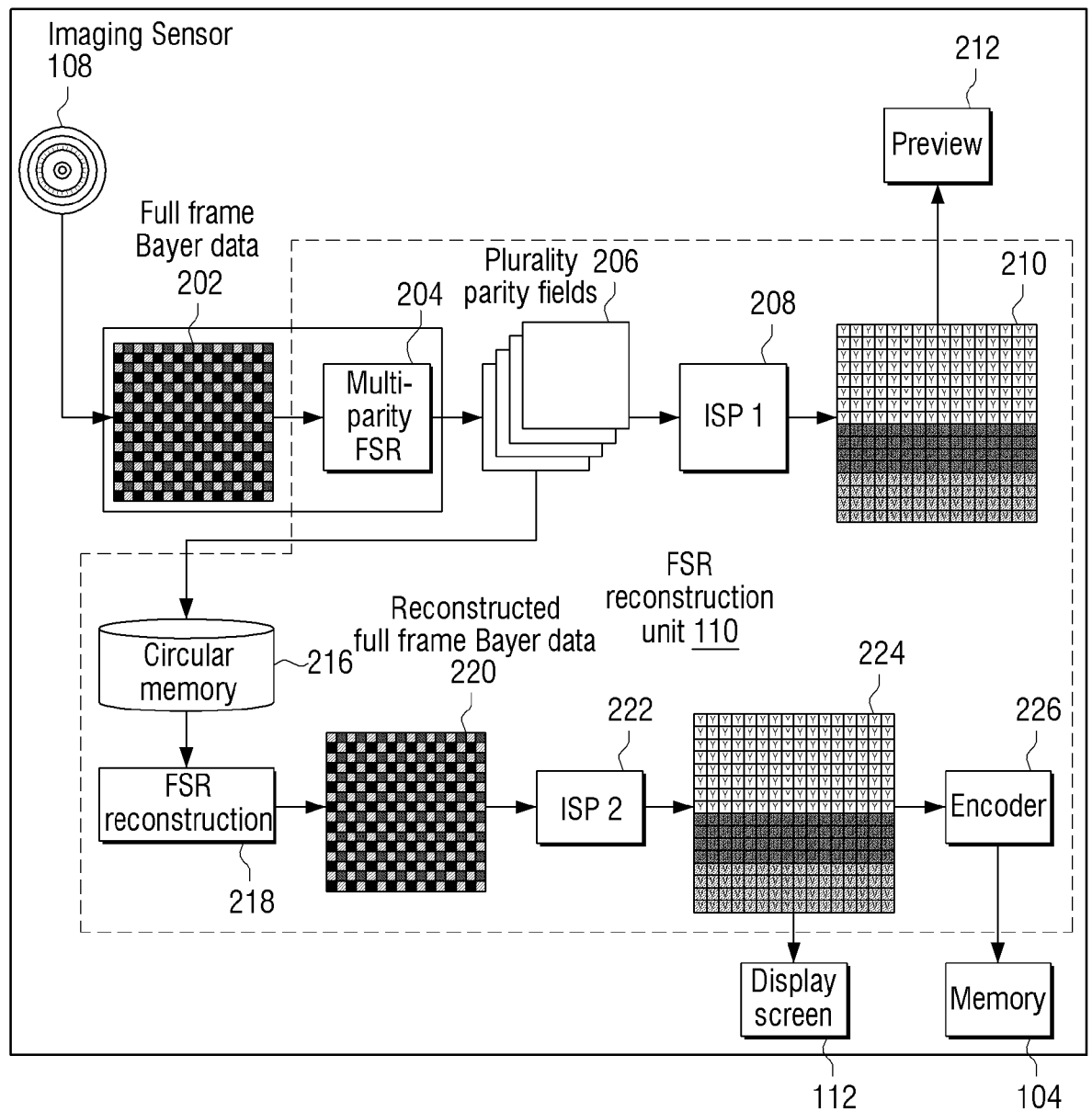
[Fig. 2A]
Pre-ISP FSR reconstruction with FSR reconstruction performed off-line

[Fig. 2B]
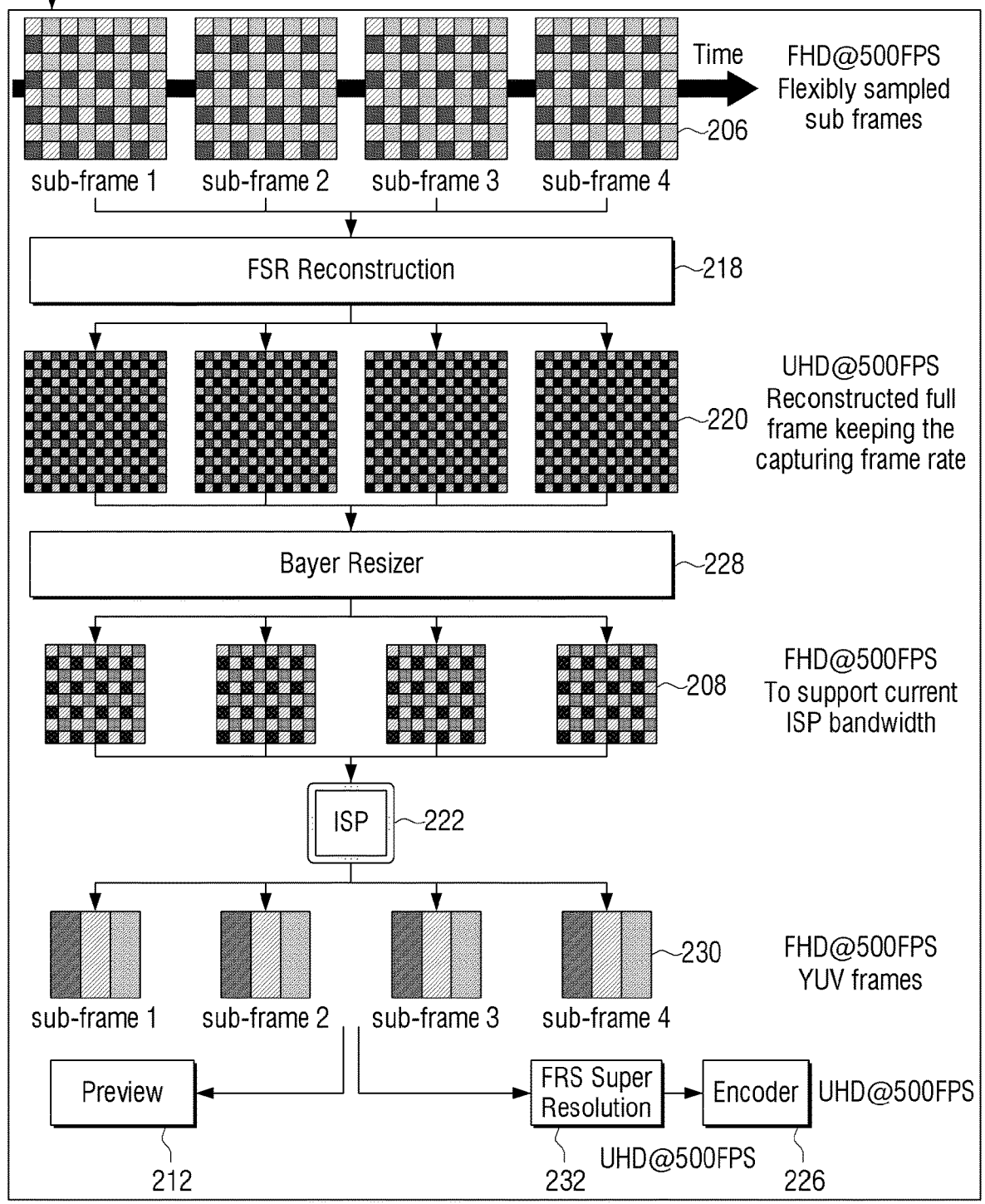

[Fig. 3A]
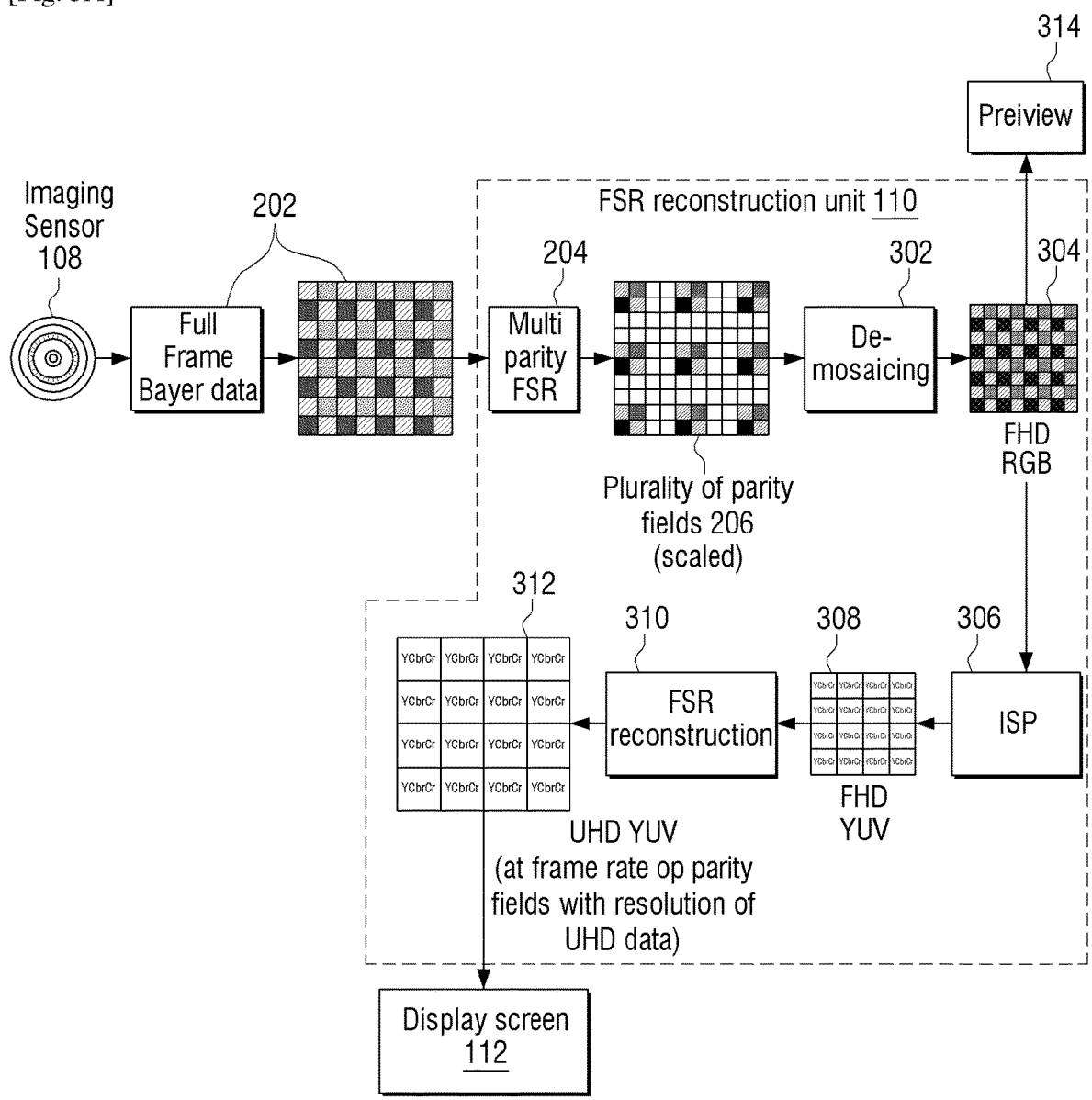

[Fig. 3B]
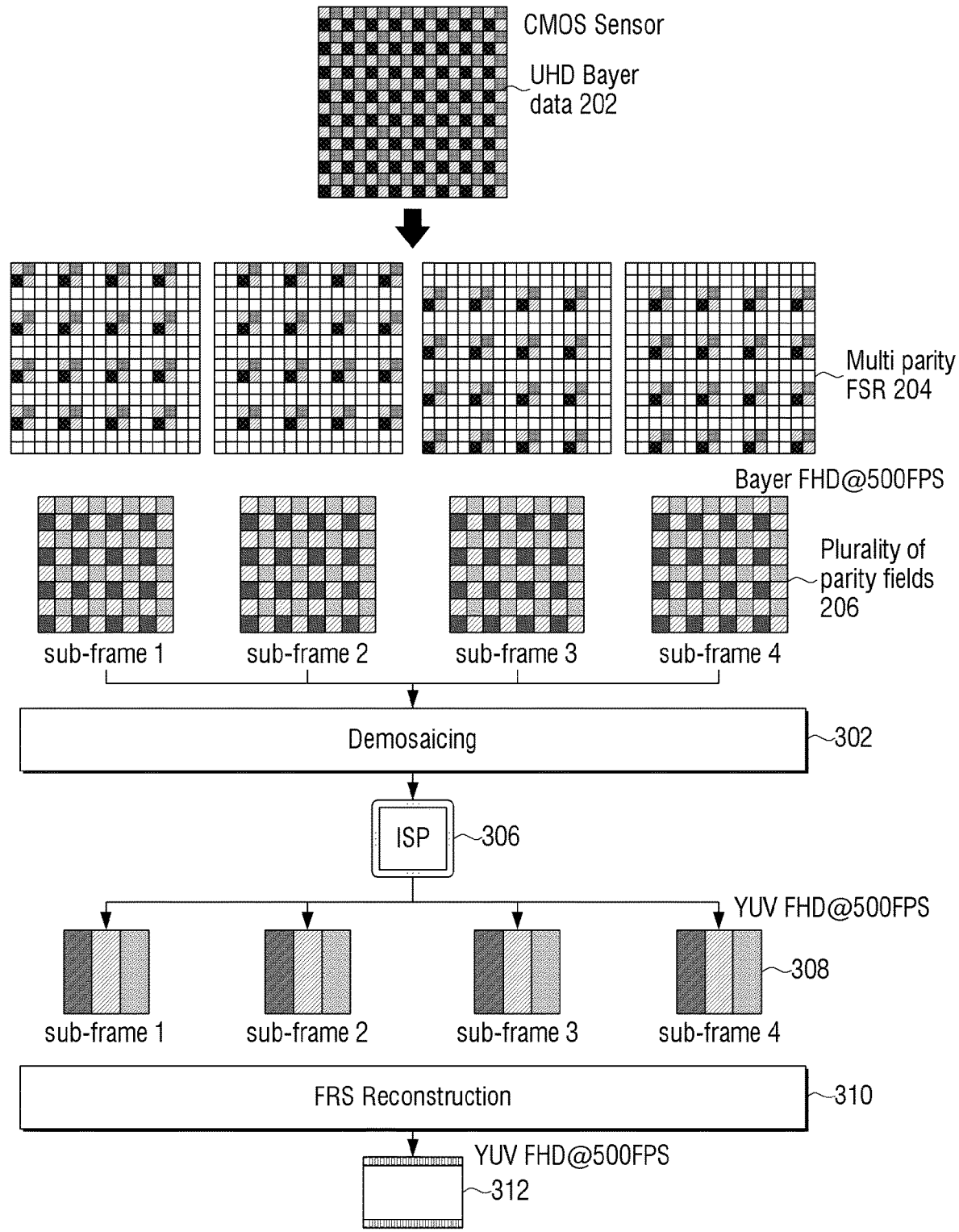

[Fig. 4]
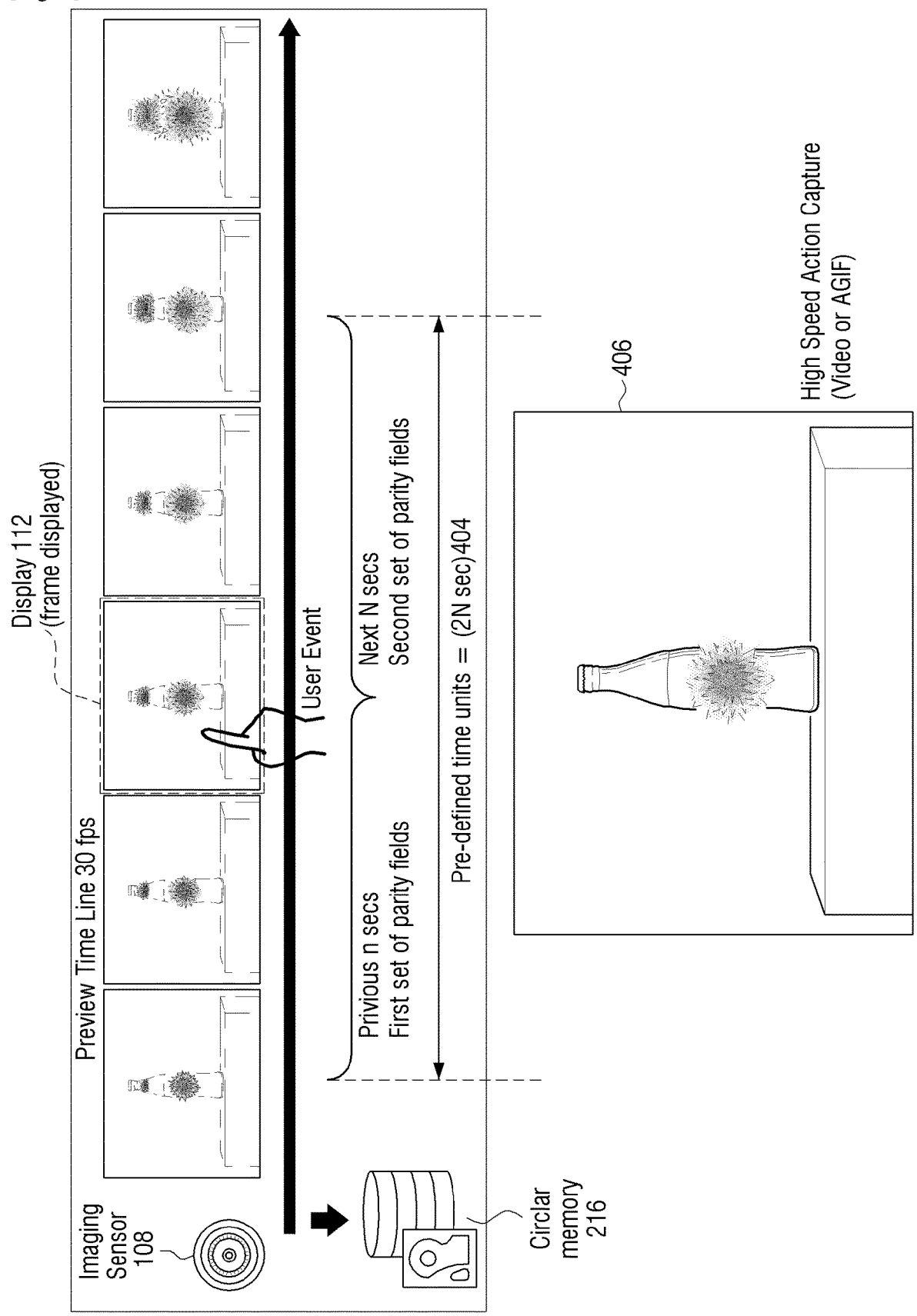

[Fig. 5A]
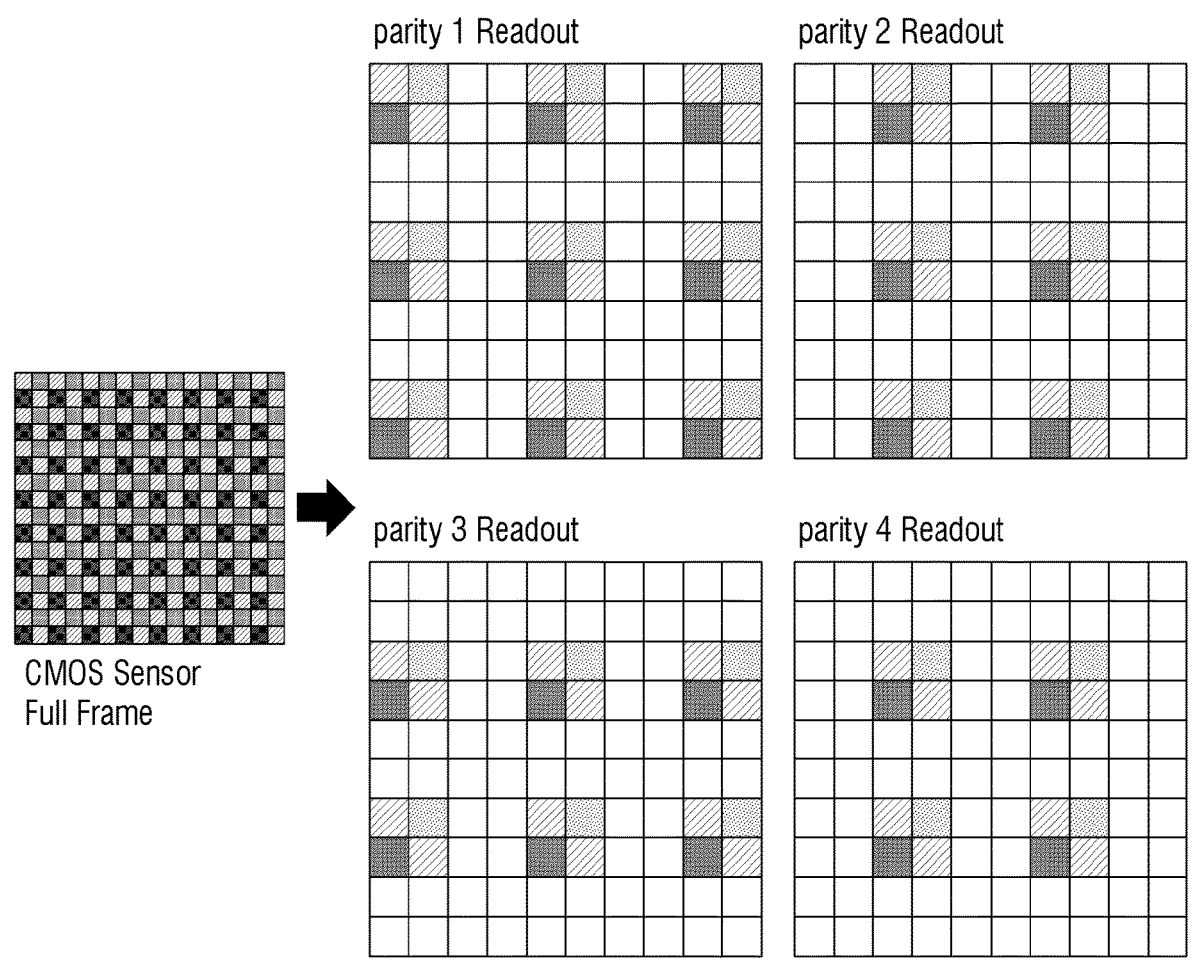

[Fig. 5B]
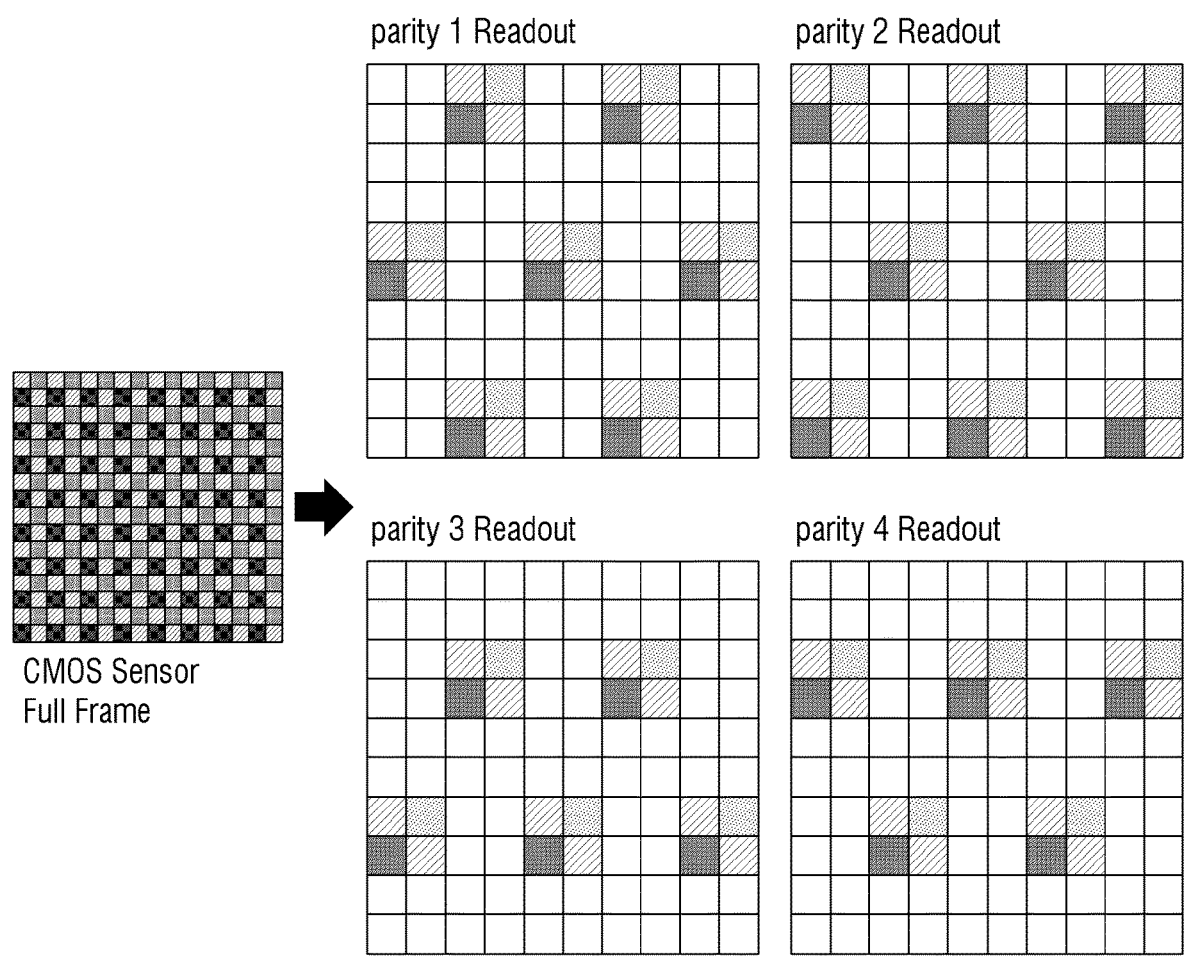

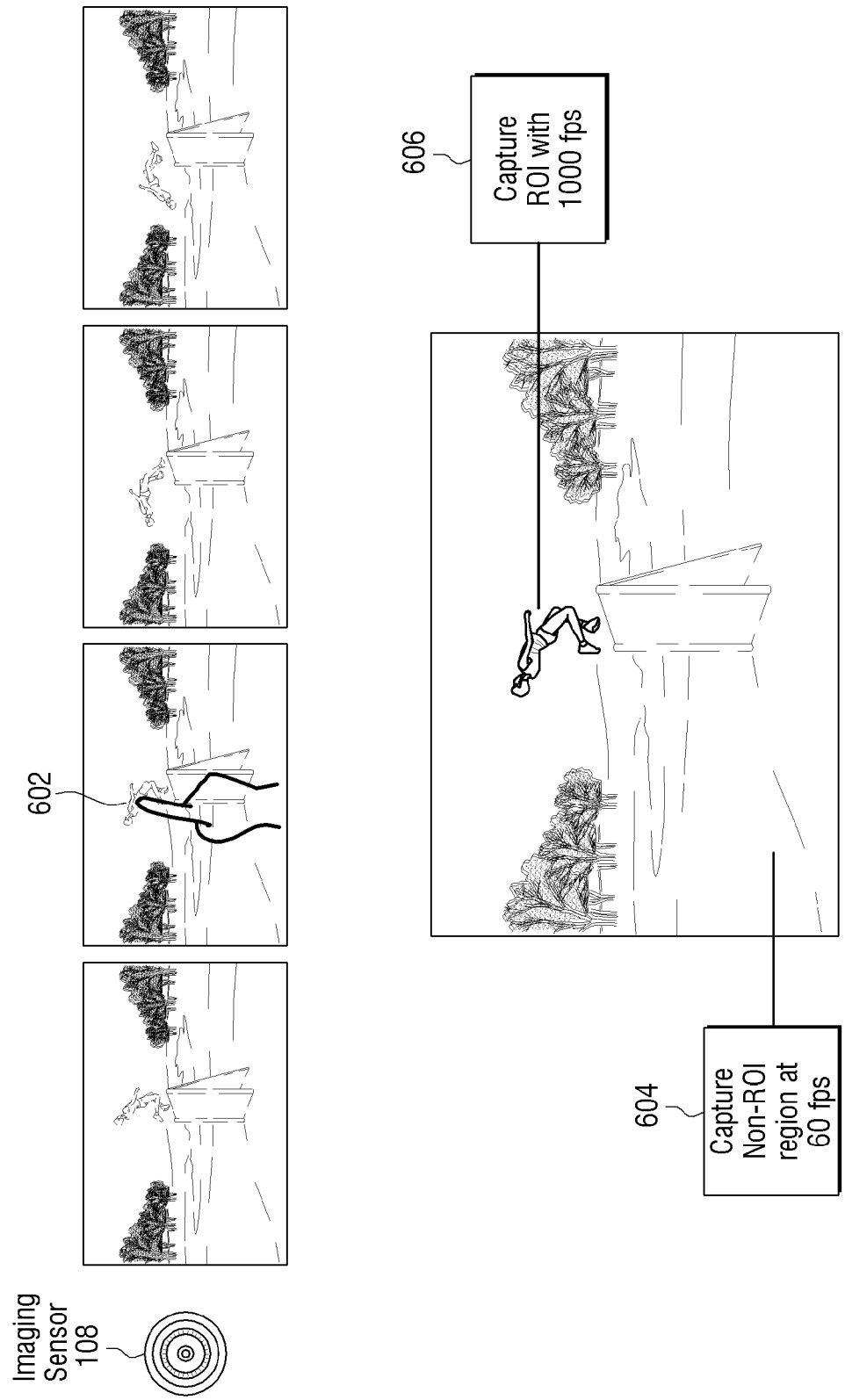
[Fig. 6A]

[Fig. 6B]
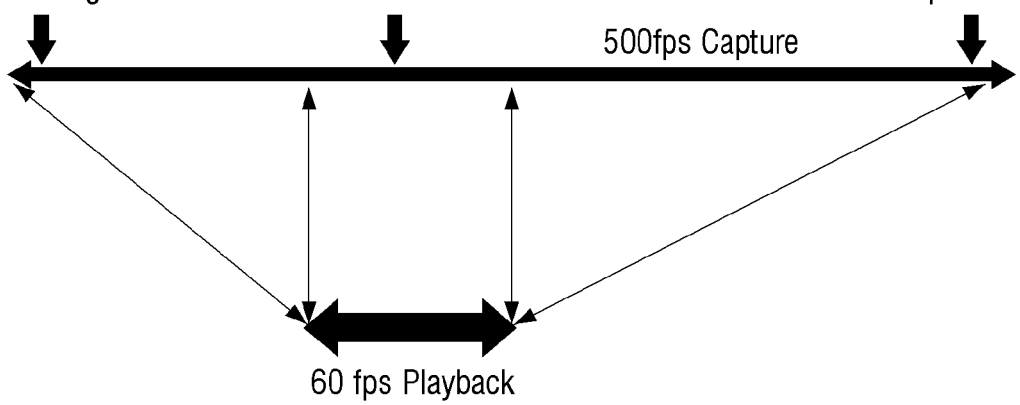
[Fig. 7]
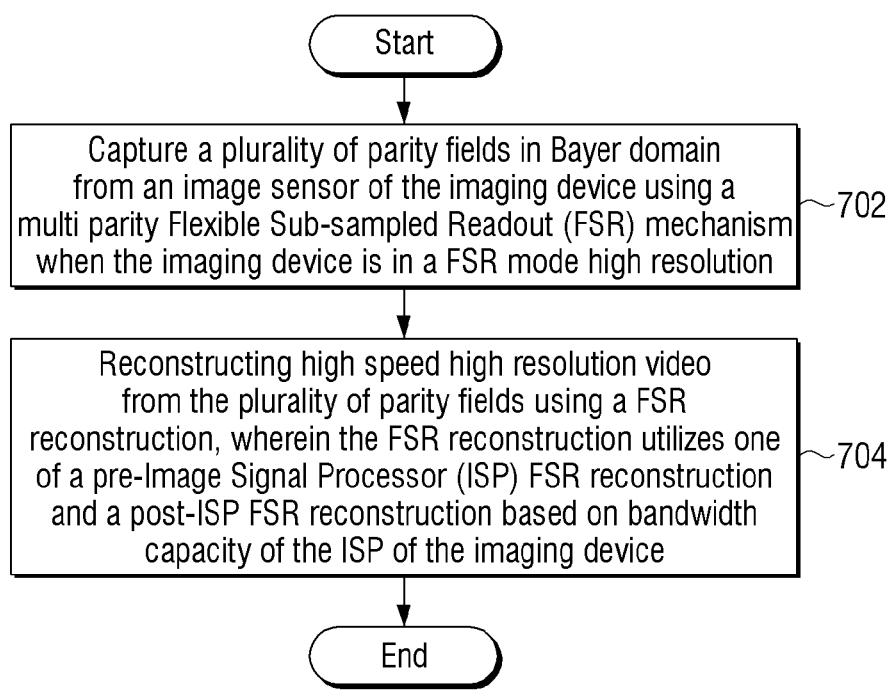

[Fig. 8]
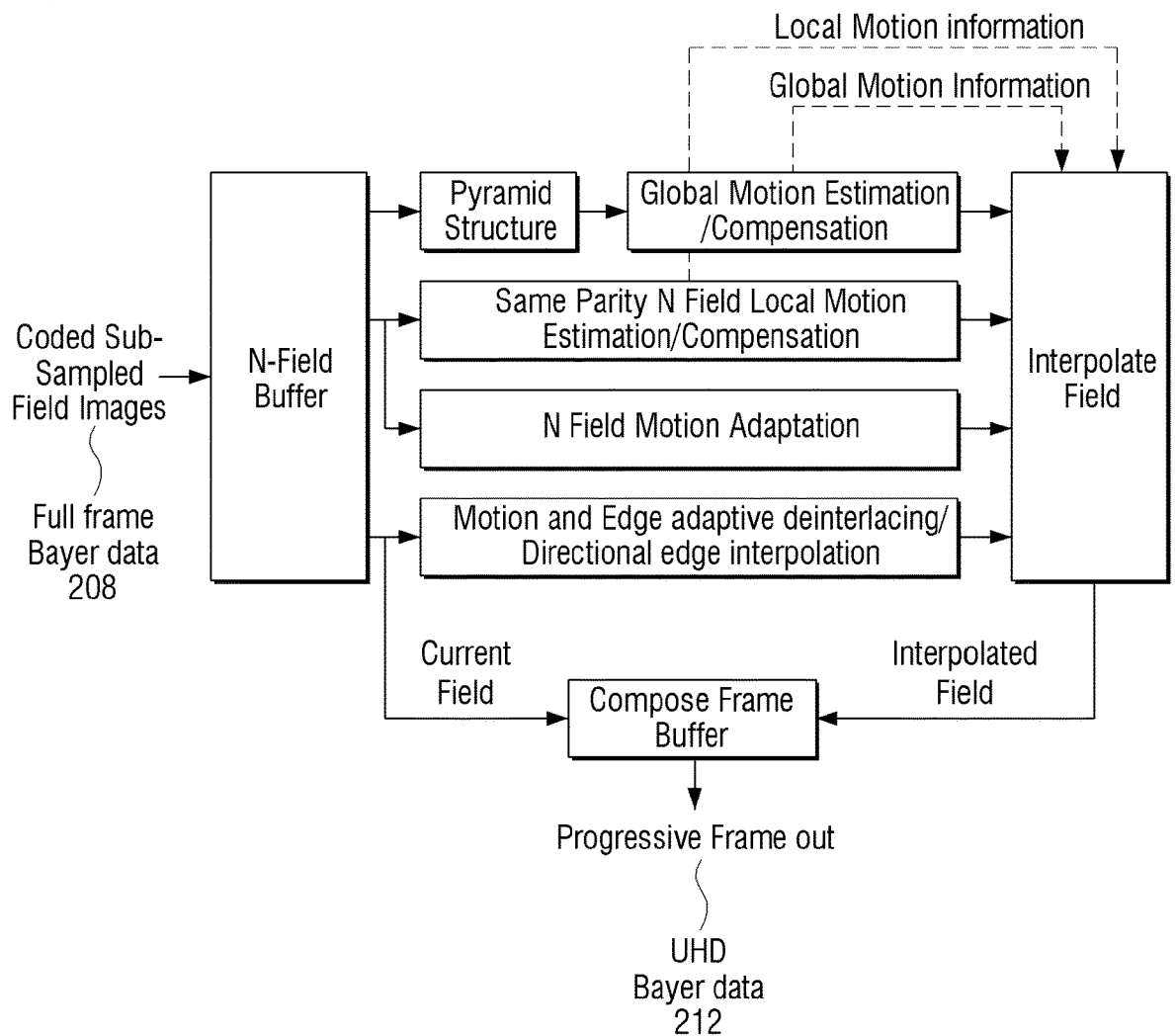

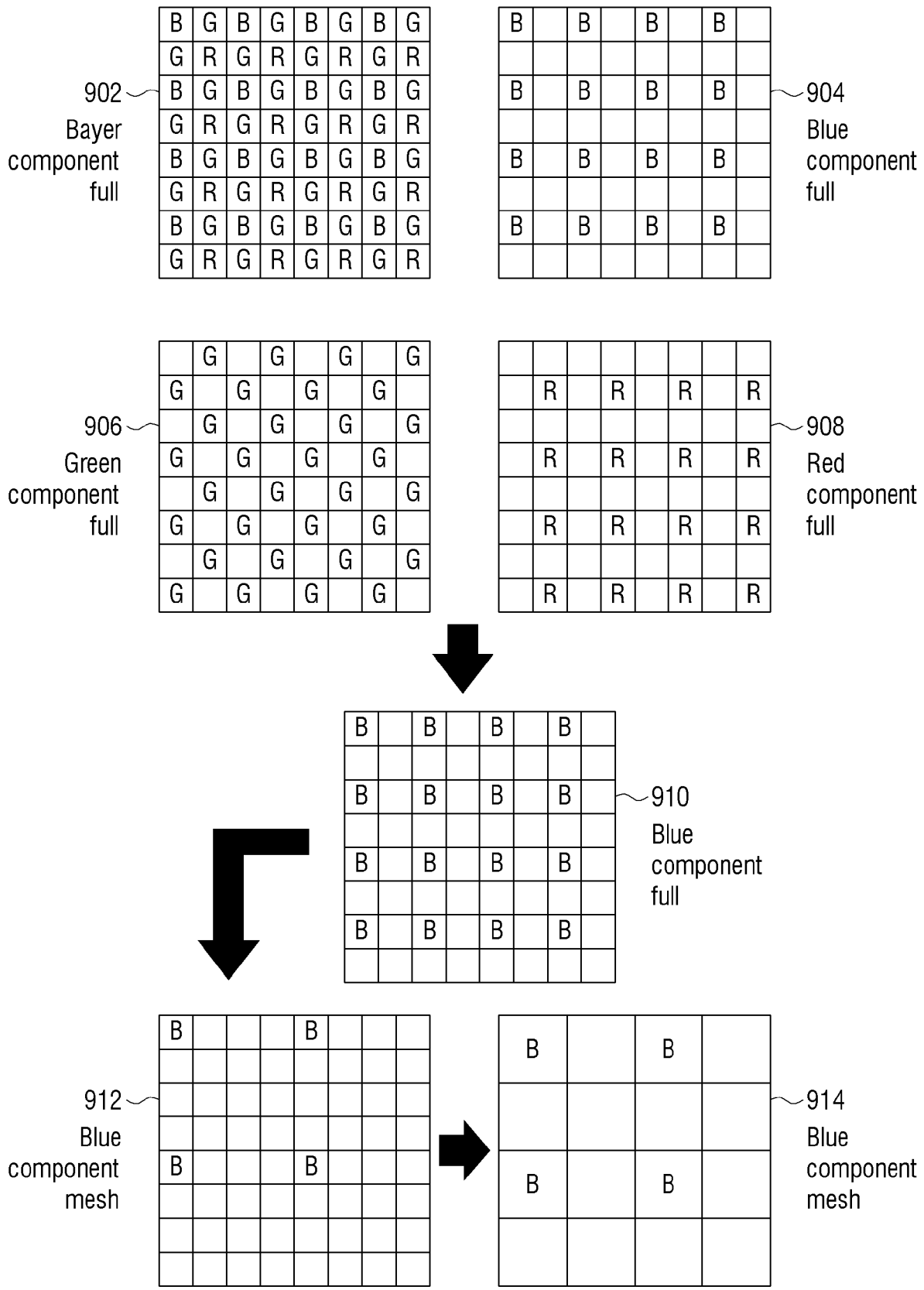
[Fig. 9]

[Fig. 10A]
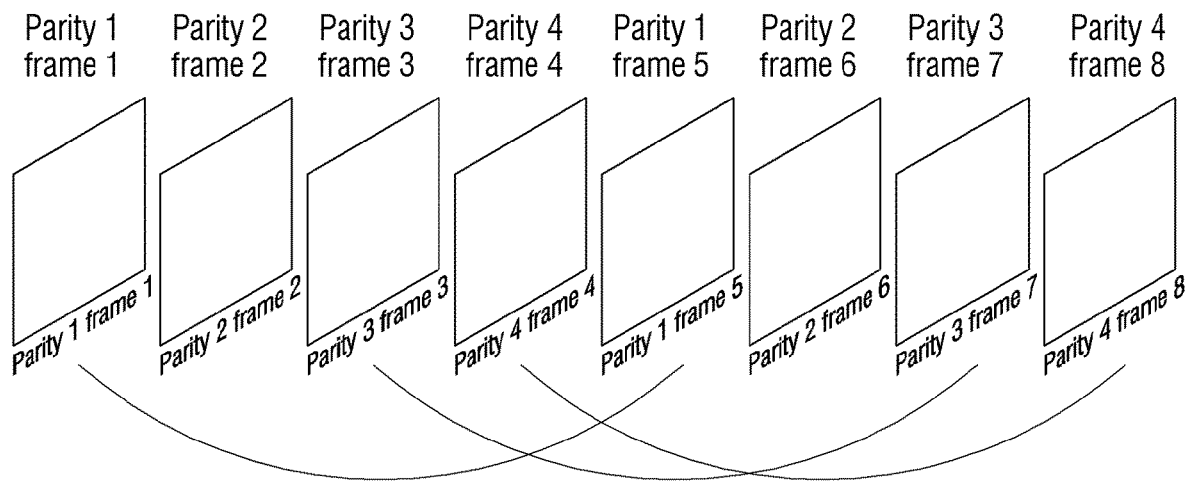
[Fig. 10B]
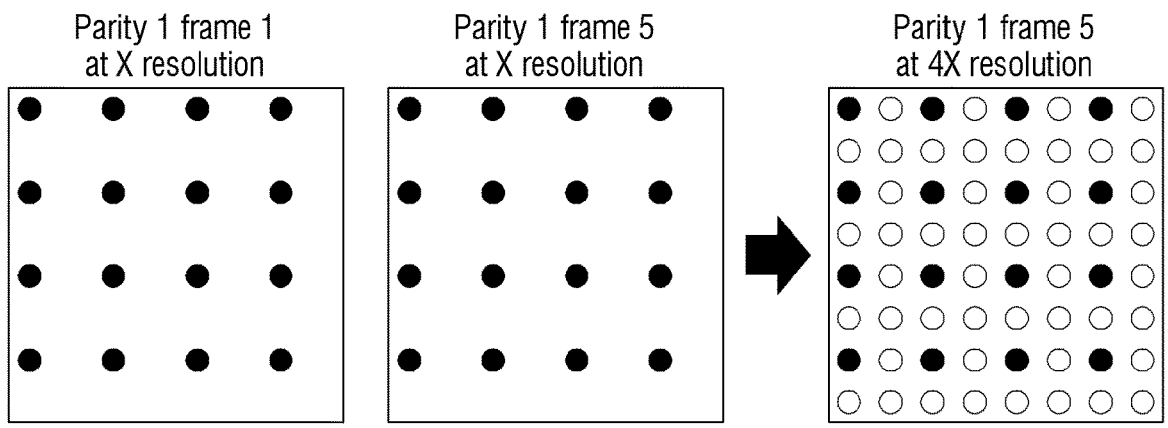

METHODS AND SYSTEMS FOR RECONSTRUCTING A HIGH FRAME RATE HIGH RESOLUTION VIDEO

TECHNICAL FIELD

The embodiments herein generally relate to the field of image processing and more particularly to image processing in imaging devices for reconstructing a high frame rate high resolution video in Bayer domain.

BACKGROUND ART

Currently, maximum achievable frame-rate for a motion capturing imaging device is limited by pixel readout rate of an imaging sensor of the imaging device. The imaging sensors used currently may allow either a slow frame-rate at full resolution (for example, 30 frames per second (fps) at Ultra High Definition (UHD) resolution or a fast frame-rate at low resolution (for example, 120 fps at Full HD (FHD) resolution). Higher frame-rates can be achieved using pixel readout modes such as sub-sampling, binning or the like but usage of the pixel readout modes sacrifices spatial for temporal resolution within a fixed bandwidth. Flexible Sub-sampled Readout (FSR) techniques enable achieving very high frame rate but provide low resolution. A FSR technique enables overcoming the bandwidth constraints of imaging sensors, such as a CMOS sensor widely used for image sensing in imaging devices. Along with low resolution limitation, the existing FSR techniques are also affected by edge artifacts and introduce a prominent flicker effect during the playback of sub-sampled frames generated from the existing FSR techniques. In addition, they also suffer from motion artifacts. Further, with existing FSR techniques the CMOS sensor sub-sampling occurs in Bayer domain and traditional image sensor pipeline is not capable of processing the subsampled Bayer pattern.

DISCLOSURE OF INVENTION

Technical Problem

Along with low resolution limitation, the existing FSR techniques are also affected by edge artifacts and introduce a prominent flicker effect during the playback of subsampled frames generated from the existing FSR techniques. In addition, they also suffer from motion artifacts. Further, with existing FSR techniques the CMOS sensor sub-sampling occurs in Bayer domain and traditional image sensor pipeline is not capable of processing the sub-sampled Bayer pattern.

Solution to Problem

The principal object of the embodiments herein is to provide methods and systems for reconstructing a high frame rate high resolution video in a Bayer domain when an imaging device is set in a Flexible Sub-sampled Readout (FSR) mode, wherein a multi parity FSR mechanism is utilized that spatially and temporally samples a full frame Bayer data by capturing the full frame Bayer data of the image sensor using a plurality of parity fields, wherein the plurality of parity fields are lower resolution frames sampled at higher frame rate, effectively enhancing capturing frame rate of the imaging device.

Another object of the embodiments herein is to provide a method utilizing a zig-zag sampling pattern for the multi parity FSR, wherein the zig-zag sampling pattern assists the FSR reconstruction to reconstruct a motion compensated artifact free high frame rate high resolution video with full frame size.

Another object of the invention is to provide methods and systems for reconstructing the high frame rate high resolution video using the plurality of parity fields generated, wherein the reconstruction is based on a FSR reconstruction mechanism that can be a pre-Image Signal Processor (ISP) FSR reconstruction or a post-ISP FSP reconstruction based on bandwidth capacity of an ISP used of the imaging device.

Another object of the embodiments herein is to provide methods and systems for reconstructing the high speed high resolution video in the Bayer domain using a FSR differential mode, within the FSR mode, that applies the high frame rate high resolution capture and reconstruction for a Region of Interest (ROI) while remaining video frame is captured at a normal frame rate.

Advantageous Effects of Invention

In view of the foregoing, an embodiment herein provides a method.

Embodiments further disclose a visual feedback system for.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments of this invention are illustrated in the accompanying drawings, throughout which like reference letters indicate corresponding parts in the various figures. The embodiments herein will be better understood from the following description with reference to the drawings, in which:

FIG. 1 illustrates a plurality of components of an imaging device for reconstructing a high frame rate high resolution video in a Bayer domain for a Flexible Sub-sampled Readout (FSR) mode of the imaging device using a multi parity FSR, according to embodiments as disclosed herein;

FIG. 2A illustrates end to end architecture of the imaging device for reconstructing the high frame rate high resolution video in the Bayer domain using pre-Image Signal Processor (ISP) FSR reconstruction, with an example in Ultra High Definition (UHD) and Full High Definition (FHD) domain illustrated in FIG. 2B, according to embodiments as disclosed herein;

FIG. 3A illustrates end to end architecture of the imaging device for reconstructing the high frame rate high resolution video in the Bayer domain using post-Image Signal Processor (ISP) FSR reconstruction, with an example illustrated in Ultra High Definition (UHD) and Full High Definition (FHD) domain in FIG. 3B, according to embodiments as disclosed herein;

FIG. 4 is an example illustrating fetching of a plurality of parity fields for the reconstruction of the high frame rate high resolution video using the FSR reconstruction on a detection of user event, triggering the FSR reconstruction, according to embodiments as disclosed herein;

FIGS. 5A and 5B illustrate example distinct parity patterns (readout patterns) utilized for generating a plurality of parity fields for the FSR reconstruction, according to embodiments as disclosed herein;

FIG. 6A and FIG. 6B illustrate a FSR differential mode in the FSR mode that provides selective high frame rate capture and reconstruction for only a Region of Interest (ROI) in a video being captured, according to embodiments as disclosed herein;

FIG. 7 is a method illustrating reconstruction of the high frame rate high resolution video in the Bayer domain for FSR mode of the imaging device using the multi parity FSR, according to embodiments as disclosed herein;

FIG. 8 illustrates functional blocks of the FSR reconstruction mechanism in the imaging device, according to embodiments as disclosed herein;

FIG. 9 illustrates processing of each color channel in the FSR reconstruction mechanism, according to embodiments as disclosed herein; and FIGS. 10A and 10B illustrate motion estimation and high resolution frame reconstruction used by the imaging device in the FSR mode, according to embodiments as disclosed herein.

BEST MODE FOR CARRYING OUT THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve methods and systems for reconstructing a high frame rate high resolution video in a Bayer domain, when an imaging device is set in a Flexible Sub-Sampled Readout (FSR) mode. The FSR mode utilizes a multi parity FSR mechanism that enables capturing of a plurality of parity fields in a Bayer domain from of an imaging sensor of the imaging device. The plurality of parity fields provide, spatial and temporal sampling of the full frame Bayer data. The plurality of parity fields are lower resolution frames sampled at higher frame rate, effectively enhancing capturing frame rate of the imaging device. The multi parity FSR utilizes a zigzag sampling or the like, wherein the zigzag sampling pattern used for the capturing of the full frame image data assists the FSR reconstruction to reconstruct a motion compensated artifact free high frame rate high resolution video with full frame size. Further, the method includes reconstructing the high frame rate high resolution video using the plurality of parity fields generated. The reconstruction is based on a FSR reconstruction mechanism that can be a pre-Image Signal Processor (ISP) FSR reconstruction or a post-ISP FSP reconstruction based on bandwidth capacity of an ISP used by the imaging device.

In an embodiment, the method includes providing a FSR differential mode, within the FSR mode, that applies the high frame rate high resolution capture and reconstruction for a Region of Interest (ROI) of a video frame being captured. In the FSR differential mode, the ROI of the full frame Bayer data captured by the imaging sensor is sampled at higher frame rate while the remaining region is sampled at a normal frame rate. Since only a portion of the video data is recorded at a higher frame rate, the bandwidth requirement for FSR differential mode is reduced.

In an embodiment, the imaging device can be a mobile phone, a smart phone, a laptop, a palmtop, a computer, a wearable computing device, a tablet, a digital camera or any device configured for capturing images and/or video.

Referring now to the drawings, and more particularly to FIGS. 1 through 10, where similar reference characters denote corresponding features consistently throughout the figures, there are shown embodiments.

FIG. 1 illustrates a plurality of components of an imaging device 100 for reconstructing the high frame rate high resolution video in the Bayer domain for the FSR mode of the imaging device 100 using the multi parity FSR, according to embodiments as disclosed herein. Referring to FIG. 1, the imaging device 100 is illustrated in accordance with an embodiment of the present subject matter. In an embodiment, the imaging device 100 may include a processor(s) 102, an input/output (I/O) interface 106, and a memory module 104. The I/O interface 106 may include, for example, a web interface, a graphical user interface for a display screen 112, interface for a imaging sensor (for example, camera lens) and the like. Further, the I/O interface 106 may allow the imaging device 100 to communicate with other systems and devices through cellular networks, Wi-Fi networks, device to device communication and the like. The memory module 104 may include various storage devices such as Secure Digital Card (SD Card), the circular memory and the like. The memory module 104 may store the full frame data of the captured video frames, various intermediate image data generated during the FSR reconstruction process. Further, the imaging device 100 comprises a FSR reconstruction unit 110. Whenever the imaging device 100 is set in the FSR mode, the FSR reconstruction unit 110 can be configured to capture the plurality of parity fields in the Bayer domain from the imaging sensor 108 of the imaging device 100. The plurality of parity fields provide, spatial and temporal sampling of the full frame Bayer data. The plurality of parity fields capture the full frame Bayer data based the multi parity FSR mechanism that utilizes the zigzag sampling pattern or the like. Further, the FSR reconstruction unit 110 can be configured to reconstruct the high speed high resolution video from the plurality of parity fields using the FSR reconstruction, wherein the FSR reconstruction utilizes the pre-ISP FSR reconstruction or the post-ISP FSR reconstruction based on bandwidth capacity of the ISP of the imaging device.

In the multi parity FSR proposed, each of the plurality of parity fields obtained, that captures the full frame data, through sampling, is assigned a parity number. Further, each of the plurality of parity fields has scaled frame size and scaled frame rate that is obtained by using the zigzag sampling pattern or the like. The sampling patterns proposed are explained in conjunction with FIGS. 5A and 5B. The frame size of the parity fields is reduced by a scaling factor and frame rate is enhanced by the scaling factor. The scaling factor is equal to a number of distinct parity patterns (each identified by a unique parity number) used by the zigzag sampling pattern or similar sampling patterns used. Thus, if the maximum current imaging sensor read out frame rate is N, then the multi parity FSR enhances the frame rate to 'scaling factor times N" (scaling factor×N). For example, a four parity field (parity pattern) of the multi parity FSR has four distinct parity fields such as parity 1, parity 2, parity 3 and parity 4, which are repeated in sequence for the plurality of parity fields generated. Thus, the 4 parity readout increases the frame rate by factor 4 and reduces the frame size or resolution by four for each parity field. Similarly, selecting 8 field parity can further increase the frame rate and reduce the frame size by scaling factor 8. The description here explains the FSR reconstruction based on four parity field multi parity FSR as an example and may not be considered as limitation.

The plurality of parity fields capture the full frame Bayer data of the imaging sensor 108 to provide sampled full frame Bayer data. The plurality of parity fields are stored in a circular memory. The circular memory can be configured to retain the plurality of parity fields for a predefined time units for example (2N seconds) based on First-in-First-out (FIFO) mechanism. The circular memory concept is further explained in conjunction with FIG. 4.

Once the parity fields are generated, the FSR reconstruction unit 110 can be configured to reconstruct the high speed high resolution video by applying the FSR reconstruction mechanism on the plurality of parity fields.

In an embodiment, the FSR reconstruction mechanism may utilize the pre-Image Signal Processor (ISP) FSR reconstruction when the imaging device has an ISP with low bandwidth capacity, wherein the FSR reconstruction for generating the high speed high resolution video is performed before performing ISP processing.

In an embodiment, the FSR reconstruction is based on the post-ISP FSR reconstruction when the imaging device has the ISP supporting higher bandwidth, wherein the FSR reconstruction generating the high speed high resolution video is performed after the ISP processing. The pre-ISP FSR reconstruction is explained further in conjunction with FIGS. 2A and 2B while the post-ISP FSR reconstruction is explained in conjunction with FIGS. 3A and 3B. The parity fields used by the FSR reconstruction mechanism are required fetched from the circular memory. Thus, the FSR reconstruction unit can be configured to retrieve the parity fields from the circular memory that are stored within the pre-defined time units around a user event (for example, N seconds before and N seconds after the detected user event), wherein the user event triggers initiating the reconstruction the high frame rate high resolution video using the FSR reconstruction mechanism. The user event can be an image recording gesture performed by a user and detected by the imaging device 100. The user event and the video frames captured within the predefined time units around the user event are described in conjunction with FIG. 4. The detailed functional block level explanation of the FSR reconstruction mechanism for high frame rate and high resolution video reconstruction is explained in conjunction with FIGS. 8 to 10.

An example below explains the how the method and the imaging device 100 proposed enhance the frame rate while maintaining higher resolution. With current camera system that utilizes a CMOS sensor to capture video is capable of capturing video at Ultra High Definition (UHD) at 250 frames per second. The imaging device 100 implementing the proposed mechanism can provide Full High Definition (FHD) parity field images at 4× for a four parity readout. For example, in practical camera system capable of capturing video at UHD at 250 frames per second, the multi parity FSR mechanism proposed can provide FHD parity field images at 4× gain with 1000 frames per second. These high frame rate images are then used by the FSR reconstruction mechanism to reconstruct frames at UHD resolution of 1000 frames per second.

In an embodiment, the FSR reconstruction unit 110 can be configured to further provide the FSR differential mode within the FSR mode. The FSR differential mode enables capture and reconstruction at high frame rate and high resolution for only the ROI of video being captured while remaining region of each video frame being captured by the imaging sensor 108 is captured (sampled) at the normal frame rate. The embodiment and is explained in conjunction with FIGS. 6A and 6B.

FIG. 2A illustrates end to end architecture of the imaging device 100 for reconstructing the high frame rate high resolution video in the Bayer domain using pre-ISP FSR reconstruction with an example illustrated in Ultra High Definition (UHD) and Full High Definition (FHD) domain in FIG. 2B, according to embodiments as disclosed herein. The image sensor 108 such as a CMOS sensor or the like captures a video providing a full frame Bayer data 202. Further, the full frame Bayer data is processed for the high speed high frame rate video capture by the FSR reconstruction unit 110. The FSR reconstruction unit 110 comprises a multi parity FSR 204 generating a plurality of parity fields 206 by sampling the full frame Bayer data 202.

Further, in an embodiment, the FSR reconstruction unit 110 can include an ISP1 208, which is an additional ISP in for preview 212 generation from the plurality of parity fields 206. The ISP1 208 utilizes parity fields having the same parity number (say parity field with parity 1 from the parity 1, parity 2, parity 3 and parity 4 assigned to the generated parity fields of a four parity field FSR) and generates a YUV data 210 for preview 212.

In an embodiment, if the preview 212 can be stored in the memory module 104, the FSR reconstruction unit can include an encoder that converts the YUV data to standard image storage format.

The plurality of parity fields 206 are stored in the circular memory 216, which retains each parity field for 2N second (predefined time units). Whenever the user event such as a record gesture is detected, the plurality of parity fields currently stored in the circular memory that lie within the N seconds before the user event (first set of parity fields) are freezed while the plurality of parity fields stored for next N seconds after the user event (second set of parity fields) are identified.

All the parity fields within the 2N seconds time span are considered for a FSR reconstruction 218 to generate a reconstructed full frame Bayer data 220 (on the fly) with high frame rate defined by the scaling factor and high resolution as that of the actual captured full frame Bayer data 202.

The pre-ISP FSR reconstruction is used when the ISP such an ISP 222 does not have the bandwidth to support the high frame rate high resolution reconstructed full frame Bayer data 220

In an embodiment, the reconstructed full frame Bayer data 220 can be stored in the memory module 104 and the ISP2 222 of the FSR reconstruction unit 110 can perform the ISP processing offline to generate a YUV data 224 from the reconstructed full frame Bayer data 220. Thus, offline ISP processing enables the high frame rate high resolution reconstructed full frame data 220 to be processed by the ISP2 222 even though having bandwidth limitation.

Thus, in pre-ISP mode, the sub-sampled data can be stored into the circular memory or the memory module 104 as shown in FIG. 2A and then offline; the sub-sampled data can be read from stored destination. Further, the FSR reconstruction can generate or reconstruct full frame Bayer data, later processed by ISP2 222 at lower frame rate (display frame rate lying within bandwidth of the ISP2 222).

However, as depicted in the example of FIG. 2B, if the ISP processing is performed online, then a Bayer resizer 228 can be used to bring in image data of the reconstructed full frame Bayer data 220 within the bandwidth of the ISP2 222.

Further, once the ISP2 222 converts the reconstructed Bayer data 222 to the YUV data 224 at full frame resolution and higher frame rate, it can be displayed on the display screen 112. Further, the YUV data 224 can be stored in the memory module 104. The FSR reconstruction unit can include an encoder 226 that converts the YUV data 224 to standard image storage format for storing the same.

As depicted in UHD FHD resolution based example of FIG. 2B, a full frame Bayer data at UHD resolution captured by the image sensor 108 is sampled based on the multi parity FSR proposed. The sub-sampled multi parity data is captured from image sensor 108 with FHD resolution at higher frame rate and reconstructed to UHD resolution keeping the captured frame rate same. Thus, this generates a scaled FHD Bayer data 206 (plurality of parity fields) when the imaging device 100 is in the FSR mode. The scaled FHD data 206 is at lower resolution (reduced frame size) scaled down by the scaling factor. As depicted in example of FIG. 2B scaling factor of 4, which is equal to number of parity fields of the scaled FHD Bayer data 208. The frame rate of the scaled FHD Bayer data 206 is scaled up by the scaling factor, 4 in the example of FIG. 2B. The scaled FHD Bayer data 206 shown in example of FIG. 2B is comprises four FHD parity fields with frame rate of 500 frames per second (fps), thus increasing the frame rate four times of the normal frame rate (N) possible for the imaging sensor used. The zigzag sampling pattern or similar sampling patterns may be used by the multi parity FSR to generate the parity fields 206 at FHD resolution. Further, whenever a user intends to capture video of interest at high frame rate high resolution he/she can use a gesture such as tap on the record icon of a camera application on the imaging device 100 running in FSR mode. The gesture is detected as a user event that triggers the FSR reconstruction mechanism. Once a user event is detected, the FSR reconstruction unit 110 can be configured to fetch the plurality of FHD parity fields from the circular memory 216.

Further, the FSR reconstruction unit 110 can be configured to reconstruct a UHD Bayer data (reconstructed full frame Bayer data 220) using the FHD parity fields fetched from the circular memory 216. Thus, the frame rate for the reconstructed UHD Bayer data 212 is same as frame rate (500 fps) of the scaled FHD Bayer data 208 providing higher frame rate at high resolution.

In the example of FIG. 2B, the FSR reconstruction is performed in the real time. Thus, the plurality of parity fields 206 (FHD parity fields) generated by sampling are fed into FSR reconstruction 218 and full frame Bayer data 220 is reconstructed. Now as the ISP2 222 cannot support full frame data at higher frame rate such as UHD@500 fps, the reconstructed full frame Bayer data 220 (UHD @500) needs to be resized to lower resolution (FHD@500 fps) using the Bayer resizer 228.

In this implementation of FIG. 2B, the FSR reconstruction is online/real time, thus the ISP2 222 utilizes the resized FHD @ 500 fps to generate a FHD YUV data 230. Further, the FSR reconstruction unit 110 can be configured to apply a FSR super resolution 232 to generate a UHD YUV data @ 500 fps providing high speed and high resolution video at frame rate of the plurality of parity fields at UHD resolution.

The preview 212 for online ISP processing of FIG. 2B can be displayed at normal frame rate, where the ISP2 222 utilizes the FHD YUV 230. The UHD YUV data is stored in the memory module 104 by encoding the image data into the standard image storage format using the encoder 226.

FIG. 3A illustrates end to end architecture of the imaging device 100 for reconstructing the high frame rate high resolution video in the Bayer domain using post-ISP FSR reconstruction mechanism in conjunction with an example in Ultra High Definition (UHD) and Full High Definition (FHD) domain illustrated in FIG. 3B, according to embodiments as disclosed herein.

The image sensor 108 such as the CMOS sensor or the like captures the video frames by sampling the full frame Bayer data 202 using the proposed multi parity FSR (zigzag sampling pattern or the like) to generate the plurality of parity fields 206. The plurality of parity fields 206 are at lower resolution (reduced frame size) scaled down by the scaling factor of 4 for four parity field zigzag sampling in example of FIG. 3B. The plurality of parity fields 206 have higher frame rate scaled up by the scaling factor of 4 as in the example of FIG. 3B with 500 frames per second (fps), thus increasing the frame rate four times of the normal frame rate (N) possible for the imaging sensor 108. Thus, the plurality of parity fields 206 generated, are stored in the circular memory 216 in the FIFO manner. Further, whenever the user intends to capture video at high frame rate high resolution (FSR mode) he/she can use the gesture such as tap on the record icon of the camera application running in FSR mode. The gesture is detected as the user event that triggers the FSR reconstruction mechanism. Once the user event is detected, the FSR reconstruction unit 110 can be configured to fetch the plurality of FHD parity fields that lie within the predefined time units around the user event (−N (first set of parity fields) to +N (second set of parity fields)=2N seconds), which are currently retained by the circular memory 216, explained in conjunction with FIG. 4.

Further, the FSR reconstruction unit 110 can be configured to perform de-mosaicing 302 on the plurality of parity fields (FHD @ 500 fps) to generate FHD Red Green Blue (RGB) 304 frames, wherein the de-mosaiced scaled FHD Bayer data is utilized generate a preview 314 of the video being captured. Further, the FHD RGB 304 demosaiced data) is provided to the ISP 306 (which has bandwidth capacity to handle high frame rate data) to reconstruct YUV image data at higher frame rate and lower resolution 308 (FHD YUV @ 500 fps). In the post-ISP FSR reconstruction mechanism, the FSR reconstruction 310 reconstructs UHD YUV 312 using the FHD YUV 308 through off-line processing. The FSR reconstruction in the post-ISP FSR reconstruction happens on a very first request of the user for playback of the recorded video frames. The frame rate of the generated YUV FHD data 308 is same as the frame rate of the plurality of parity fields 206. The UHD YUV data 312 provides higher resolution with higher frame rate equal to the frame rate of the plurality of parity fields 206. The reconstructed high speed and high resolution video can be displayed on the display screen 112 during playback.

FIG. 4 is an example illustrating fetching of a plurality of parity fields for the reconstruction of the high frame rate high resolution video using one of the FSR reconstruction mechanism on a detection of user event triggering the FSR reconstruction, according to embodiments as disclosed herein. The figure depicts a preview video frame sequence on display screen 112 displayed at a normal 30 fps. From video frames captured by the image sensor 108, the plurality of parity fields 206 are generated and stored on the circular memory 216.

Further, whenever the user intends to capture video of interest at high frame rate high resolution (FSR mode) he/she can use the gesture such as tap on the record icon of the camera application running in FSR mode. The gesture is detected as 'user event' that triggers the FSR reconstruction mechanism. Once the user event is detected, the FSR reconstruction unit 110 can be configured to fetch the plurality of FHD parity fields currently retained in the circular memory 402 for a time span of 2N seconds (−N (first set of parity fields) to +N (second set of parity fields)=2N seconds). As depicted, the 2N seconds span is distributed around the user event with N seconds before and N seconds after the user event. This enables capturing the video of interest more precisely by considering video frames adjacent to these and eliminating any chance of losing a video event of interest 406 due to lag between user action and actual capture. The plurality of parity fields that do not lie within the time span are discarded due to FIFO action and hence memory space consumed for the plurality of parity fields generated is static even though the FSR mode is enabled in the imaging device 100 for a longer duration. The proposed imaging device 100, through usage of circular memory reduces consumption of memory by not retaining the undesired high frame rate parity field data. The plurality of parity fields generated continuously, are overwritten over old parity fields data.

FIGS. 5A and 5B illustrate example distinct parity patterns (readout patterns) utilized for generating a plurality of parity fields for the FSR reconstruction, according to embodiments as disclosed herein;

The FIG. 5A illustrates an example of the mesh sampling pattern that may be used in an embodiment of the multi parity FSR. The mesh sampling pattern shown utilizes a four parity read out, where alternate columns of the imaging sensor (such as CMOS sensor) are read simultaneously using four parity readouts, parity 1, parity 2, parity 3 and parity 4 per frame, effectively increasing the frame rate four times. However, since only alternate columns are active simultaneously, the speed at which data is read may not be enhanced.

With zig-zag sampling pattern of FIG. 5B the four parity readouts are designed such that the complete frame data is readout with all columns of the imaging sensor 108 active during every parity readout operation. Thus zigzag sampling provides a higher frame rate as well as enhanced data readout speed.

FIGS. 6A and 6B illustrate a FSR differential mode in the FSR mode that provides selective high frame rate capture for only a Region of Interest (ROI) in the plurality of video frames being captured, according to embodiments as disclosed herein. The FSR differential motion mode captures and reconstructs the high frame rate high resolution video for a Region of Interest (ROI) of each video frame providing 1000 fps while remaining video frame is captured at a normal or lower frame rate of 60 fps. The mode generates the plurality of parity fields for only the ROI of the full frame Bayer data. Since only a portion of the video is recorded at a higher frame rate, the bandwidth limitation required in FSR differential mode is reduced.

FIG. 7 is a method illustrating reconstruction of the high frame rate high resolution video in the Bayer domain for FSR mode of the imaging device using the multi parity FSR, according to embodiments as disclosed herein. Whenever the imaging device 100 is set in the FSR mode, at step 702, the method 700 includes allowing the FSR construction unit 110 to capture the plurality of parity fields from the image sensor 108 to provide sampled the full frame Bayer data of the image sensor 108. The plurality of parity fields in Bayer domain sample the full frame Bayer data using the multi parity FSR mechanism. Further, at step 702, the method 700 includes allowing the FSR construction unit 110 to reconstruct the high speed high resolution video from the plurality of parity fields using the FSR reconstruction, wherein the FSR reconstruction utilizes one of the pre ISP FSR reconstruction and the post-ISP FSR reconstruction based on bandwidth capacity of the ISP of the imaging device. In the multi parity FSR proposed, each of the plurality of parity fields obtained from the sampling of the full frame data is assigned a parity number. Further, each of the plurality of parity fields is assigned the parity number and has scaled frame size and scaled frame rate that is obtained by using the zig-zag sampling pattern or the like. The sampling patterns proposed are explained in conjunction with FIGS. 5A and 5B. The frame size of the parity fields is reduced by the scaling factor and frame rate is enhanced by the scaling factor. The scaling factor is equal to the number of distinct parity patterns (each identified by a unique parity number) used by the zigzag sampling pattern or the like. For example, a four parity field (parity pattern) of the multi parity FSR has four distinct parity fields such as parity 1, parity 2, parity 3, and parity 4 that are repeated in sequence for the plurality of parity fields generated. Thus, the 4 parity readout increases the frame rate by factor 4 and reduces the frame size or resolution by four for each parity field. Similarly selecting 8 field parity can further increase the frame rate and reduce the frame size. The description here explains the FSR reconstruction based on four parity field multi parity FSR as an example and may not be considered as limitation. Multi parity FSRs with 8 field parity, 16 field parity and so on may also be used based on the need for the enhancement required in the frame rate.

The plurality of parity fields generated by sampling the full frame Bayer data captured by the imaging sensor are stored in the circular memory. The circular memory 216 can be configured to retain the plurality of parity fields for a predefined time units for example (2N seconds) based on First-in-First-out (FIFO) mechanism. The circular memory concept is as explained in conjunction with FIG. 4.

Once the parity fields are generated, the method 700 allows the FSR reconstruction unit 110 to reconstruct the high speed high resolution video by applying the FSR reconstruction mechanism on the plurality of parity fields.

In an embodiment, the FSR reconstruction mechanism may utilize the pre-Image Signal Processor (ISP) FSR reconstruction when the imaging device has an ISP with low bandwidth capacity, where the FSR reconstruction for generating the high speed high resolution video is performed before performing ISP processing.

In an embodiment, the FSR reconstruction is based on the post-ISP FSR reconstruction when the imaging device has the ISP supporting higher bandwidth, where the FSR reconstruction generating the high speed high resolution video is performed after the ISP processing. The pre-ISP FSR reconstruction is as explained in conjunction with FIGS. 2A and 2B while the post-ISP FSR reconstruction is as explained in conjunction with FIGS. 3A and 3B and not repeated for brevity. The plurality of parity fields, are fetched from the circular memory 216. Thus, the FSR reconstruction unit can be configured to retrieve the parity fields from the circular memory 216 that are stored within the pre-defined time units around a user event (for example, N seconds before and N seconds after the detected user event), wherein the user event triggers initiating the reconstruction the high frame rate high resolution video using the FSR reconstruction mechanism. The user event can be an image recording gesture performed by the user and detected by the imaging device 100. The user event and the video frames captured within the predefined time units around the user event are as described in conjunction with FIG. 4. The detailed functional block level explanation of the FSR reconstruction mechanism for high frame rate and high resolution video reconstruction is explained in conjunction with FIGS. 8 to 10.

In an embodiment, the method 700 allows FSR reconstruction unit 110 to further provide the FSR differential motion mode within the FSR mode. The FSR differential mode enables capture and reconstruction at high frame rate and high resolution for only the ROI of video being captured while remaining region of each video frame being captured by the imaging sensor 108 is captured (sampled) at the normal frame rate. The embodiment and is explained in conjunction with FIGS. 6A and 6B.

The various actions in method 700 may be performed in the order presented, in a different order or simultaneously. Further, in some embodiments, some actions listed in FIG. 7 may be omitted.

FIG. 8 illustrates the FSR reconstruction mechanism in the imaging device, according to embodiments as disclosed herein. The figure depicts the functional block diagram of the method proposed comprising major blocks such as a field buffer, a global motion estimation/compensation, an N-field local motion estimation/compensation, an N-field motion adaptation, and a directional edge interpolation module. Details of global motion estimation/compensation block, local motion estimation and compensation block, 4 field motion adaptation and directional edge interpolation block is described in conjunction with FIG. 9 and FIG. 10.

FIG. 9 illustrates processing of each color channel in the FSR reconstruction mechanism, according to embodiments as disclosed herein. As depicted in the figure, to maintain the Bayer pattern 902 in the reconstructed frame, each channel is processed separately. A Green color channel with two components G1 and G2 906, a Blue color channel with component B 904 and a Red color channel with component R 908. For each single channel, such as the shown Blue channel 910, the processing considers one read one skip case 912 and 914. Thus each color channel is provided an equal weightage.

FIGS. 10A and 10B illustrate motion estimation and high resolution frame reconstruction used by the imaging device in the FSR mode, according to embodiments as disclosed herein. As depicted in FIG. 10A, the motion estimation for frame 5 is done taking frame 1 as reference since previous parity 1 before frame 5 is frame 1. Likewise frame 2 is reference frame to frame 6, frame 3 is reference frame to frame 7, frame 4 is reference frame to frame 8. In an example implementation, the current motion estimation is block based with the block size is 5×5. The search window size is 15×15. At end of motion estimation a motion vector for every pixel is obtained with every pixel having a 5×5 block with the pixel itself being at the left top corner.

In FIG. 10B high resolution frame reconstruction is depicted. As shown in FIG. 10A parity 1 frame 1, parity 1 frame 5 are present and it is required to fill out empty parity in frame 5. A motion vector (x',y') for a pixel at (x,y) is available. So the movement in x direction is (x'−x) and the movement in y direction is (y'−y). Between frame 1 and frame 5 there are three frames. To calculate parity two pixel in Parity 1 frame 5 at 4× resolution frame, ((x'−x)/4+x) and ((y'−y)/4+y) position in Parity 1 frame 5 at X resolution picture and duplicate it in parity 2 position of parity 1 frame 5 at 4× resolution is calculated. Likewise action is performed for ((x'−x)/2+x) & ((y'−y)/2+y) position pixel assigned to parity 3 pixel. Also for parity four the pixel from (3*(x'−x)/2+x) & (3*(y'−y)/2+y) position is picked and assigned to parity four. This way motion is averaged out across four pixels.

The embodiments disclosed herein can be implemented through at least one software program running on at least one hardware device and performing network management functions to control the network elements. The network elements shown in FIG. 1 through FIG. 10 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A controlling method of an image device, comprising:
 capturing a plurality of parity fields in a Bayer domain from an image sensor of the image device; and
 generating a video by reconstructing the plurality of parity fields by using one of a pre-Image Signal Processor (ISP) Flexible Sub-sampled Readout (FSR) reconstruction and a post-ISP FSR reconstruction based on bandwidth capacity of an ISP of the image device,
 wherein the generating further comprises:
  reconstructing the plurality of parity fields by using the pre-ISP FSR reconstruction in response to bandwidth of the ISP of the image device being unable to process the plurality of parity fields which have a frame rate that is scaled up by a scaling factor,
  detecting a user event for recording full frame Bayer data corresponding to a video captured by the image sensor,
  fetching, from a circular memory, a first parity field set corresponding to a plurality of parity fields stored in a time unit which is predetermined before the user event and a second parity field set corresponding to a plurality of parity fields stored in a time unit which is predetermined after the user event,
  reconstructing full frame Bayer data by using the first parity field set and the second parity field set,
  resizing the full frame Bayer data reconstructed in ISP bandwidth, and
  generating full frame YUV data by processing the resized full frame Bayer data.

2. The method of claim 1,
 wherein the generating of the video comprises generating the plurality of parity fields which respectively have parity numbers by using a zig-zag sampling pattern,
 wherein a frame rate of each of the plurality of parity fields is scaled up in accordance with a scaling factor, and a frame size of each of the plurality of parity fields is scaled down in accordance with the scaling factor, and wherein the scaling factor corresponds to a number of the plurality of parity fields.

3. The method of claim 1, further comprising:
storing the plurality of parity fields based on a First-in-First-out (FIFO) mechanism.

4. The method of claim 1, further comprising:
generating a preview video by processing the first parity field set and the second parity field set, wherein the preview video is generated by processing a first parity field included in the first parity field set and a second parity field included in the second parity field set and the first parity field and the second parity field have an identical parity number.

5. The method of claim 1,
wherein the generating, further comprises:
reconstructing the plurality of parity fields by using the pre-ISP FSR reconstruction in response to bandwidth of the ISP of the image device not being able to process the plurality of parity fields which have a frame rate that is scaled up by a scaling factor,
detecting a user event for recording full frame Bayer data corresponding to a video captured by the image sensor,
fetching, from a circular memory, a first parity field set corresponding to a plurality of parity fields stored in a time unit which is predetermined before the user event and a second parity field set corresponding to a plurality of parity fields stored in a time unit which is predetermined after the user event,
demosaicing the first parity field set and the second parity field set to generate demosaiced data,
generating YUV data of which a frame rate and a frame size are identical to a frame rate and a frame size of the plurality of parity fields from the demosaiced data, and
generating full frame YUV data by reconstructing the YUV data.

6. The method of claim 5, further comprising:
generating a preview video by processing the demosaiced data.

7. The method of claim 1, wherein the capturing comprises
capturing a plurality of parity fields by sampling a part of full frame Bayer data which corresponds to a Region of Interest (ROI) from among full frame Bayer data acquired from the image sensor of the image device.

8. An image device, comprising:
an image sensor configured to capture a plurality of parity fields in a Bayer domain; and
an FRS reconstruction unit configured to generate a video by reconstructing the plurality of parity fields by using one of a pre-TSP FSR reconstruction and a post-SP FSR reconstruction based on bandwidth capacity of an ISP of the image device,
wherein the FRS reconstruction unit, in response to detecting a user event for recording full frame Bayer data corresponding to a video captured by the image sensor:
reconstructs the plurality of parity fields by using the pre-ISP FSR reconstruction, in response to bandwidth of the ISP of the image device being unable to process the plurality of parity fields which have a frame rate that is scaled up by a scaling factor,
fetches, from the circular memory, a first parity field set corresponding to a plurality of parity fields stored in a time unit which is predetermined before the user event and a second parity field set corresponding to a plurality of parity fields stored in a time unit which is predetermined after the user event,
reconstructs full frame Bayer data by using the first parity field set and the second parity field set,
resizes the full frame Bayer data reconstructed in ISP bandwidth, and generates full frame YUV data by processing the resized full frame Bayer data.

9. The device of claim 8,
wherein the FRS reconstruction unit generates the plurality of parity fields which respectively have parity numbers by using a zig-zag sampling pattern,
wherein a frame rate of each of the plurality of parity fields is scaled up in accordance with a scaling factor, and a frame size of each of the plurality of parity fields is scaled down in accordance with the scaling factor, and
wherein the scaling factor corresponds to a number of the plurality of parity fields.

10. The device of claim 8, further comprising:
a circular memory configured to store the plurality parity fields based on a FIFO mechanism.

11. The device of claim 10,
wherein the FRS reconstruction unit, in response to detecting a user event for recording full frame Bayer data corresponding to a video captured by the image sensor:
reconstructs the plurality of parity fields by using the pre-ISP FSR reconstruction in response to bandwidth of the ISP of the image device not being able to process the plurality of parity fields which have a frame rate that is scaled up by a scaling factor,
fetches, from the circular memory, a first parity field set corresponding to a plurality of parity fields stored in a time unit which is predetermined before the user event and a second parity field set corresponding to a plurality of parity fields stored in a time unit which is predetermined after the user event,
demosaics the first parity field set and the second parity field set to generate demosaiced data,
generates YUV data of which a frame rate and a frame size are identical to a frame rate and a frame size of the plurality of parity fields from the demosaiced data, and
generates full frame YUV data by reconstructing the YUV data.

12. The device of claim 11, wherein the FRS reconstruction unit generates a preview video by processing the demosaiced data.

13. The device of claim 8,
wherein the FRS reconstruction unit generates a preview video by processing the first parity field set and the second parity field set, and
wherein the preview video is generated by processing a first parity field included in the first parity field set and a second parity field included in the second parity field set and the first parity field and the second parity field have an identical parity number.

* * * * *